J. COPLON.
SPEED CONTROLLER FOR MOTOR VEHICLES.
APPLICATION FILED JULY 11, 1912.
1,067,317.
Patented July 15, 1913.
2 SHEETS—SHEET 1.
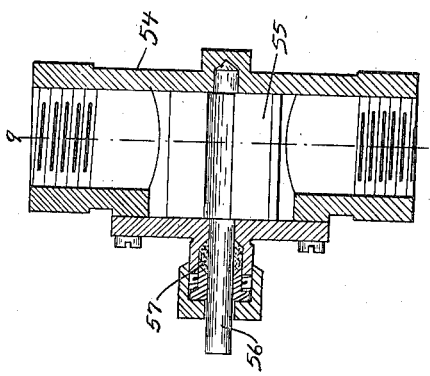
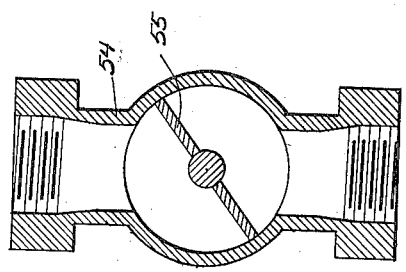
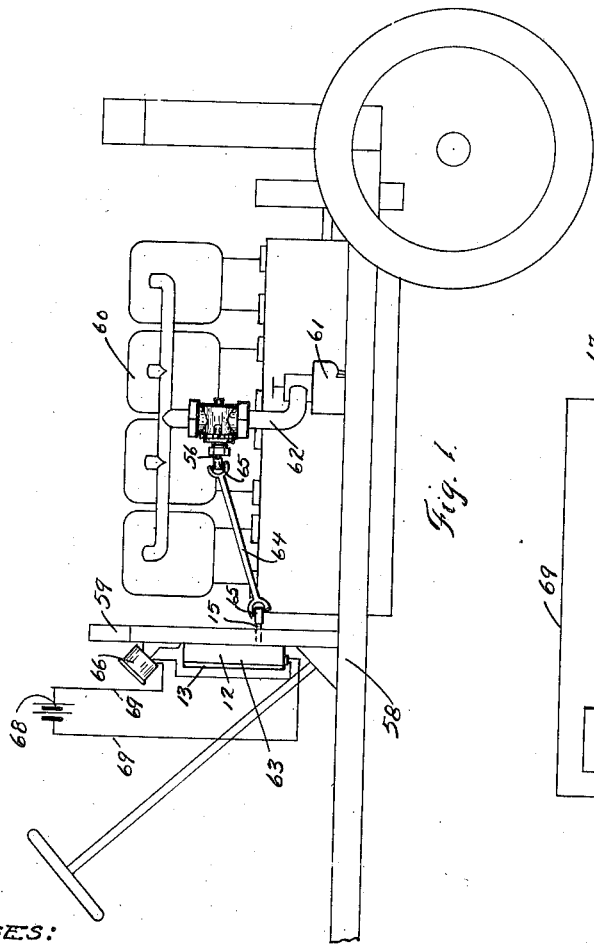
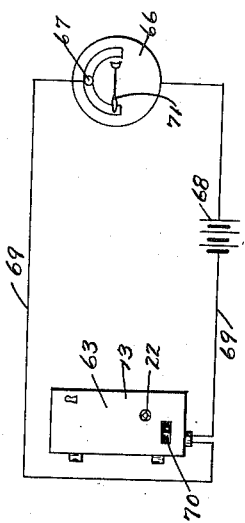
WITNESSES:
Walter H. Kelley
Bessie E. Dempsey
INVENTOR
Joseph Coplon
BY J. Wm. Ellis
ATTORNEY.

J. COPLON.
SPEED CONTROLLER FOR MOTOR VEHICLES.
APPLICATION FILED JULY 11, 1912.
1,067,317.
Patented July 15, 1913.
2 SHEETS—SHEET 2.
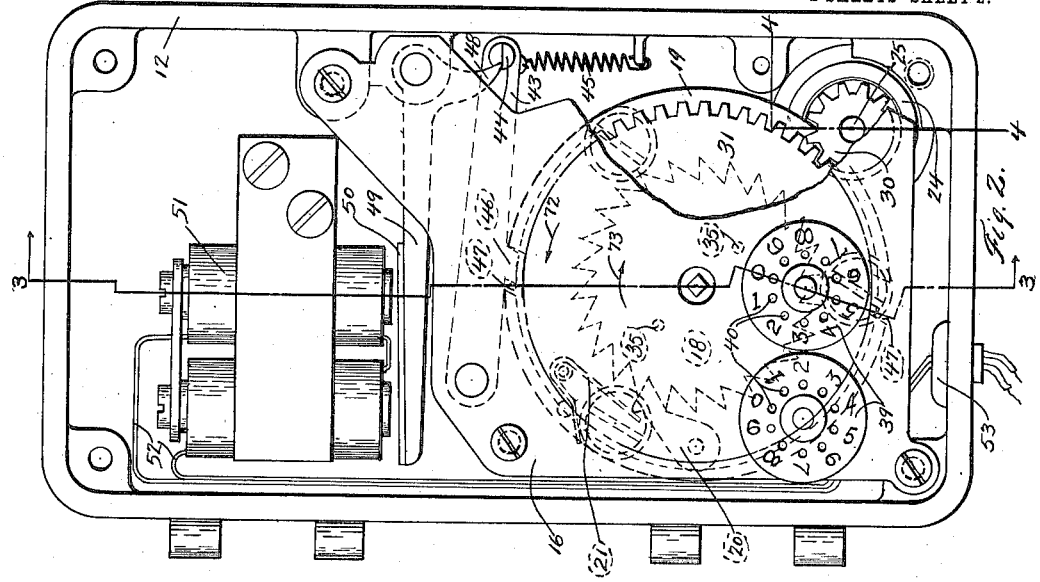
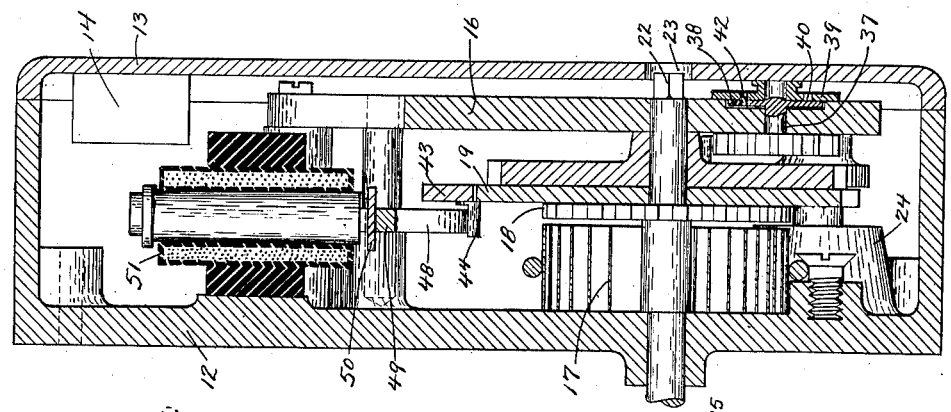
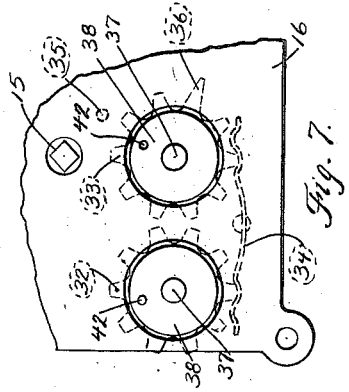
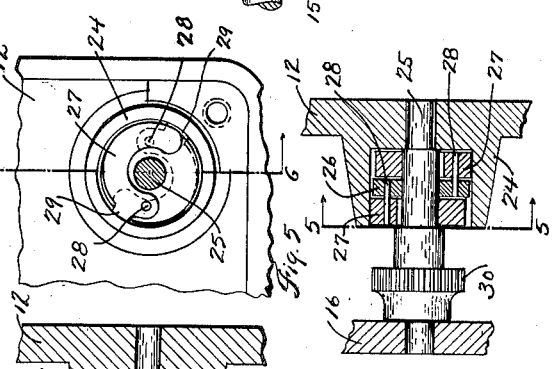
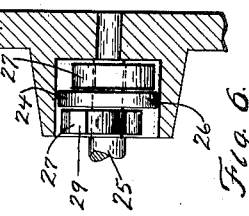
WITNESSES:
INVENTOR
Joseph Coplon
BY
ATTORNEY.

UNITED STATES PATENT OFFICE.

JOSEPH COPLON, OF BUFFALO, NEW YORK.

SPEED-CONTROLLER FOR MOTOR-VEHICLES.

1,067,317.   Specification of Letters Patent.   Patented July 15, 1913.

Application filed July 11, 1912. Serial No. 708,928.

*To all whom it may concern:*

Be it known that I, JOSEPH COPLON, a citizen of the United States of America, and a resident of the city of Buffalo, county of Erie, and State of New York, have invented certain new and useful Improvements in Speed-Controllers for Motor-Vehicles, of which the following is a full, clear, and exact description.

The general objects of my invention are to provide a device, whereby the speed of a motor vehicle may be checked when a predetermined rate of speed is about to be exceeded and also to provide means, whereby the owner or properly authorized person may readily adjust or set the predetermined speed so that it will be impossible for an unauthorized person using the vehicle, to exceed the speed at which the device is set.

Other objects of my invention are: to provide an automatic controlling device which is at all times independent of and disconnected from the manual controlling means of the motor vehicle; to provide a device which shall be so constructed that when the predetermined speed of a motor vehicle is about to be exceeded, the supply of gas will be only temporarily cut off; to provide a device which will not in any way interfere with the full supply of gas to the engine of the motor vehicle, except when the vehicle is about to exceed the predetermined speed limit; also to provide a device which shall indicate the number of times it has been operated to check the speed.

Reference is to be had to the accompanying drawings forming part of this specification, in which like characters of reference indicate like parts, throughout the several views of which:

Figure 1 shows, in a diagrammatical manner, my invention in place on a motor vehicle. Fig. 2 represents a front view of a portion of my device with the cover thereof removed. Fig. 3 is a sectional elevation of the device shown in Fig. 2 and is taken on line 3—3 of that figure. Fig. 4 is a fragmental sectional elevation of a portion of my device and is taken on line 4—4 of Fig. 2. Fig. 5 is a fragmental front view of the brake mechanism of my device and is taken on line 5—5 of Fig. 4. Fig. 6 is a sectional elevation of the part shown in Fig. 5 and is taken on line 6—6 of that figure. Fig. 7 is a front elevation of a fragmental portion of my device and shows the counters in broken lines with the dials removed. Fig. 8 represents a sectional elevation of the throttle valve of my device. Fig. 9 is a sectional elevation of the same and is taken on line 9—9 of Fig. 8. Fig. 10 is a diagrammatical view of the electrical connections of my device.

Referring now to Figs. 2 to 7, 12 represents the casing of my device, which contains the working parts thereof, and which is provided with a suitable cover 13. 14 is a lock by which the mechanism contained in the casing may be protected against being tampered with by unauthorized persons. Rotatably carried in preferably the lower part of the casing 12 is a shaft 15, the outer end of which is supported by a bearing plate 16, rigidly carried by the casing. 17 is the main spring of my device, one end of which is secured to the shaft 15 and the other end thereof is rigidly secured to the casing by any well known means, not shown. Secured to or made integral with the shaft 15 and disposed in front of the spring 17 is a ratchet wheel 18. A disk 19 is rotatably mounted on the shaft 15 and adjacent to the ratchet wheel 18. This disk carries a ratchet pawl 20 which engages with the teeth of the ratchet wheel 18 and which is held in contact therewith by means of a suitable spring 21, also carried by the said disk. The shaft 15 is provided with an outer square-shaped end 22 and the cover 13 of the casing is provided with an aperture 23, whereby a key may be used to revolve the shaft 15 and thus wind the spring 17. 24 is a brake cup which is preferably made integral with the casing 12 and within which is rotatably disposed the brake mechanism. A brake shaft 25 is rotatably carried by the casing 12 and the bearing plate 16. This shaft extends through the center of the brake cup 24 and is provided with a rigid collar 26, which is disposed in the center of the brake cup. On either side of the collar 26 are disposed brake members 27, 27, one end of each of which is pivotally secured to the collar 26, by means of the pins 28. Each of the brake members 27 is preferably crescent-shaped and provided at the pivoted end with a lug 29 which bears against the interior of the brake cup and thus presents a brake surface. Rigidly carried near the upper end of the brake shaft 25 is a gear pinion 30. This pinion engages with a gear 31 which is rotatably mounted on the shaft 15 and rotatable with the disk 19. Rotatably carried by the bearing plate 16 is a counting mechanism which comprises preferably two notched wheels 32 and 33 which are normally held against rotation by means of the spring 34, carried by the bearing plate. Carried by the gear 31 and preferably disposed diametrically opposite each other are trip pins 35, 35, which engage with the notched wheel 33 and cause the same to be intermittently rotated when the device is in operation. The notched wheel 33 is provided with an elongated tooth 36 which engages with the notched wheel 32 and thus partially rotates the same one notch for each complete revolution of the wheel 33. These notched wheels are preferably each secured to shafts 37, 37, each of which is provided with an integral disk 38 which is disposed preferably in a recess formed in the top of the bearing plate 16. Disposed over the top of each of the shafts 37 is a counter dial 39, each of which is provided with a plurality of apertures 40, which are equal in number to the number of notches provided on the notched wheels 32 and 33. These counter dials are arranged to rotate with the shafts 37, 37, by having one of the apertures in each in engagement with a pin 42, carried by each of the disks 38. These counter dials may be moved longitudinally on the shafts 37, 37, when the cover 13 of the casing is opened and they may thus be reset at will. The cover 13 of the casing is provided with an aperture 70 through which the number indicated by the counter dial may be seen (Fig. 10). 43 is a latch lever which is pivotally carried at one end by the bearing plate 16 and which has secured at its opposite end, the upper end of a spring 45. The lower end of the spring 45 is secured to the casing 12. Provided on the latch lever 43 and preferably nearer its pivoted end than its free end is a lug 46 which engages with one of the notches 47 provided in the periphery of the disk 19. The faces of the lug 46 are set at an angle with a radial line passing through the disk 19. The notches 47 are disposed preferably diametrically opposite each other and their faces are set at substantially the same angle as those of the lug 46, so that, when the latch lever is released, these angularly disposed and engaging faces will permit the disks 19 to revolve under the tension of the main spring 17. 44 is a trip pin which is rigidly carried at the outer end of the latch lever 43 and is provided with a flat upper surface. A trip lever 48 is pivotally carried by the bearing plate 16 and its lower pointed end is engageable with the flattened surface of the trip pin 44. The trip lever 48 is provided with a right-angled arm 49 which carries a magnet armature 50. 51 is an electro-magnet which is rigidly secured to the casing 12 and which is arranged with its magnet cores immediately above the armature 50. 52 are electric conductors which are connected to the terminals of the electro-magnet and which are passed through an insulating bushing 53 located preferably in the bottom of the casing 12.

Referring now to Figs. 8 and 9, where I have shown the preferable form of throttle valve, 54 represents the casing of the valve and 55 the butterfly valve thereof. This butterfly valve is rotatably carried by a shaft 56 which preferably passes through a suitable stuffing box 57. The body of the casing is provided with suitable connecting means, whereby it may be inserted in the intake pipe of any internal combustion engine.

In Figs. 1 and 10, I have shown the diagrammatical arrangement of my device as applied to a motor car. In these figures 58 represents a portion of an automobile chassis, 59 the dash board thereof and 60 the motor. 61 is a carbureter and 62 the intake manifold. 63 represents my device attached to the dashboard 59 and connecting the shaft 15 thereof with the shaft 56 of the throttle valve is a shaft 64 and universal joints 65, 65. 66 represents a speedometer of the standard type which is provided with an electrical contact point 67. 68 represents an electric battery and 69 the electric conductors, whereby the battery is connected with the speedometer and the electro-magnet 51.

In the drawings, all the parts of my device, except the butterfly valve, are shown in their normal positions. When the motor vehicle on which my device is attached, is about to exceed the set or predetermined speed, the indicator needle 71 of the speedometer 66 will make electrical contact with the point 67 on the dial of the speedometer. This will allow current from the battery 68 to flow through the electro magnet 51 and thus energize the same when the electro-magnet is energized, the armature 50 carried by the arm 49 of the trip lever 48 will be drawn up against the cores of the magnet, which will disengage the lower point of the trip lever 48 from the trip pin 44. When the pin 44 is thus disengaged, the latch lever 43 will be raised by the rotation of the disk 19 which is actuated by the main spring 17. As this disk rotates, it carries the shaft 15 therewith and rotates the butterfly valve 55, thus slowly closing and opening again the throttle valve. If the speed of the car is not reduced by the time the throttle is again fully opened, the disk will continue to rotate and again close and open the throttle. When the speed has been reduced below the predetermined point, the electro-magnet 51 will be deënergized, which will allow the arm 49 to drop to the position shown in the drawings and when one of the notches 47 in the disk is about to engage with the lug 46 on the latch arm, the spring 45 will draw the said latch arm into the said notch, where it will be held by the engagement of the trip lever 48 with the flattened surface of trip pin 44. When the disk 19 revolves, the gear 31 is revolved therewith and as this gear meshes with the gear 30 carried by the brake shaft 25, the said brake shaft will also be rotated. As the brake shaft rotates at a comparatively high speed, the free ends of the brake members 27, 27, will be thrown outwardly by centrifugal force and cause the lugs 29 thereof to be pressed against the sides of the brake cup 24 and thus govern the speed of rotation of the disk. Each time the speed limit is exceeded and the disk 19 rotated half a revolution, one of the pins 35 engages with one of the notches of the notched wheel 33 and this indicates the number of times the speed limit has been exceeded. When the disk is operating, it rotates in the direction indicated by the arrow 72 and when the main spring 17 is being wound, the shaft 15 and ratchet wheel 18 are rotated in the direction indicated by the arrow 73.

While I have for convenience, shown and described a spring as the means for operating the shaft of my device, it is obvious that other types of motive power may be applied with equal efficiency. Obviously, if desired, the throttle valve of my device may be so constructed as to allow a small quantity of gas to pass when it is closed or this valve may be dispensed with entirely and the shaft 15 of my device may be connected to the air mixing valve of the carbureter. These and many other modifications of the details herein shown and described, may be made without departing from the spirit of my invention or the scope of the appended claims, and I do not wish to be limited to the exact embodiment herein shown and described.

Having thus described my invention, what I claim is:

1. The combination with the engine throttle of a self-propelled vehicle, a speedometer provided with an electrical contact and an electric battery; of a speed controller comprising a casing, a main shaft rotatably carried by said casing, means for actuating said shaft, a notched disk mounted upon said shaft and rotated thereby, electrically controlled mechanical means engageable with said notched disk, means connecting said shaft with said engine throttle and electric connections between said battery, speedometer and said electrically controlled mechanical means.

2. The combination with the engine throttle of a self-propelled vehicle, a speedometer provided with an electrical contact and an electric battery; of a speed controller comprising a casing, a main shaft rotatably carried by said casing, means for actuating said shaft, a ratchet wheel rigidly carried by said shaft, a notched disk rotatably mounted upon said shaft, adjacent to said ratchet wheel, a spring pressed ratchet pawl connecting said ratchet wheel and disk, electrically controlled mechanical means engageable with said notched disk, means connecting said shaft with said engine throttle and electric connections between said battery, speedometer and electrically controlled mechanical means.

3. The combination with the engine throttle of a self-propelled vehicle, a speedometer provided with an electrical contact and an electric battery; of a speed controller comprising a casing, a main shaft rotatably carried by said casing, means for actuating said shaft, a notched disk mounted upon said shaft and rotated thereby, a speed governor connected with said shaft and controlling the speed of rotation thereof, electrically controlled mechanical means engageable with said notched disk, means connecting said shaft with said engine throttle and electric connections between said battery, speedometer and said electrically controlled mechanical means.

4. The combination with the engine throttle of a self-propelled vehicle, a speedometer provided with an electrical contact and an electric battery; of a speed controller comprising a casing, a bearing plate carried by said casing, a main shaft rotatably carried by said casing, means for actuating said shaft, a notched disk mounted upon said shaft and rotated thereby, means carried by said bearing plate and connected to said shaft for indicating the number of revolutions which the said shaft makes, electrically controlled mechanical means engageable with said notched disk, means connecting said shaft with said engine throttle and electric connections between said battery, speedometer and the said electrically controlled mechanical means.

5. The combination with the engine throttle of a self propelled vehicle, a speedometer provided with an electrical contact and an electric battery; of a speed controller comprising a casing, a bearing plate carried by said casing, a main shaft rotatably carried by said casing, means for actuating said shaft, a notched disk mounted upon said shaft and rotated thereby, a release arm pivoted at one end of said bearing plate and engageable with said notched disk, a trip pin at the opposite end of said release arm, a trip lever having a right-angled arm pivotally carried by said bearing plate, said trip lever having its lower end engageable with said trip pin, an electro-magnet armature carried by said trip lever, an electro-magnet for controlling said armature and electrical connections between said battery, speedometer and electro-magnet.

6. The combination with the engine throttle of a self propelled vehicle, a speedometer provided with an electrical contact and an electric battery; of a speed controller comprising a casing, a bearing plate carried by said casing, a main shaft rotatably carried by said casing, means for actuating said shaft, a notched disk mounted upon said shaft and rotated thereby, a speed governor connected with said main shaft, comprising a brake cup carried by said casing, a shaft rotatably disposed in said cup, a collar rigidly carried by said shaft, brake members disposed on either side of said collar and pivotally connected thereto, said brake members being adapted to bear against the interior of said brake cup, means connecting said shaft with said main shaft, electrically controlled means engageable with said notched disk and electrical connections between said battery, speedometer and electrically controlled mechanical means.

In testimony whereof, I have hereunto signed my name in the presence of two subscribing witnesses.

JOSEPH COPLON.

Witnesses:
J. WM. ELLIS,
WALTER H. KELLEY.